(12) United States Patent
Hadar et al.

(10) Patent No.: US 9,359,112 B2
(45) Date of Patent: Jun. 7, 2016

(54) FASTENING ASSEMBLY AND CONTAINER COMPRISING THE SAME

(71) Applicant: PLASEL PLASTIC LTD., Lavon (IL)

(72) Inventors: Nir Hadar, Kibbutz Shefayim (IL); Michael Kleitman, Carmiel (IL)

(73) Assignee: PLASEL PLASTIC LTD., Lavon (IL)

( * ) Notice: Subject to any disclaimer, the term of this patent is extended or adjusted under 35 U.S.C. 154(b) by 0 days.

(21) Appl. No.: 14/401,321

(22) PCT Filed: May 16, 2013

(86) PCT No.: PCT/IL2013/050419
§ 371 (c)(1),
(2) Date: Nov. 14, 2014

(87) PCT Pub. No.: WO2013/171749
PCT Pub. Date: Nov. 21, 2013

(65) Prior Publication Data
US 2015/0122768 A1    May 7, 2015

Related U.S. Application Data

(60) Provisional application No. 61/648,298, filed on May 17, 2012.

(51) Int. Cl.
| B65D 41/04 | (2006.01) |
| B65D 6/00 | (2006.01) |
| B65D 8/00 | (2006.01) |
| B65D 21/08 | (2006.01) |
| F16B 37/08 | (2006.01) |

(52) U.S. Cl.
CPC ............ *B65D 41/0471* (2013.01); *B65D 21/08* (2013.01); *F16B 37/085* (2013.01)

(58) Field of Classification Search
CPC .... B65D 41/0471; B65D 21/08; F16B 37/085
USPC ...................... 220/288–304, 787, 788, 8, 4.21
See application file for complete search history.

(56) References Cited

U.S. PATENT DOCUMENTS

| 3,675,804 | A | | 7/1972 | Micalief | |
| 3,844,443 | A | * | 10/1974 | Cudzik | 220/296 |
| 4,245,754 | A | * | 1/1981 | Ellis | 220/304 |
| 4,373,641 | A | * | 2/1983 | Banich et al. | 215/331 |
| 4,456,137 | A | * | 6/1984 | Lyman | 215/230 |

(Continued)

FOREIGN PATENT DOCUMENTS

| EP | 1 054 172 A2 | 11/2000 |
| GB | 2 399 559 A | 9/2004 |

(Continued)

*Primary Examiner* — Fenn Mathew
*Assistant Examiner* — James N Smalley
(74) *Attorney, Agent, or Firm* — Vorys, Sater, Seymour & Pease LLP

(57) ABSTRACT

Provided is a fastening assembly and a container system containing the same. The fastening assembly includes a cylindrical neck member, including a series of convolutions axially extending around at least a portion of the external surface of the neck member and forming an interrupted helical thread of incomplete formation; a collar member configured for screw fastening with the neck member, including at least one rib configured for thread-engagement with the helical thread, the at least one rib forming a portion of an internal thread.

9 Claims, 12 Drawing Sheets

(56) References Cited

U.S. PATENT DOCUMENTS 4,643,330 A * 2/1987 Kennedy .................. 220/288
4,721,220 A    1/1988 Northup
5,605,242 A    2/1997 Hwang
6,979,163 B2  12/2005 Brletich et al.

FOREIGN PATENT DOCUMENTS

| WO | 96/38677 A1 | 12/1996 |
| WO | 2008/030409 A2 | 3/2008 |
| WO | 2009/100485 A1 | 8/2009 |

* cited by examiner

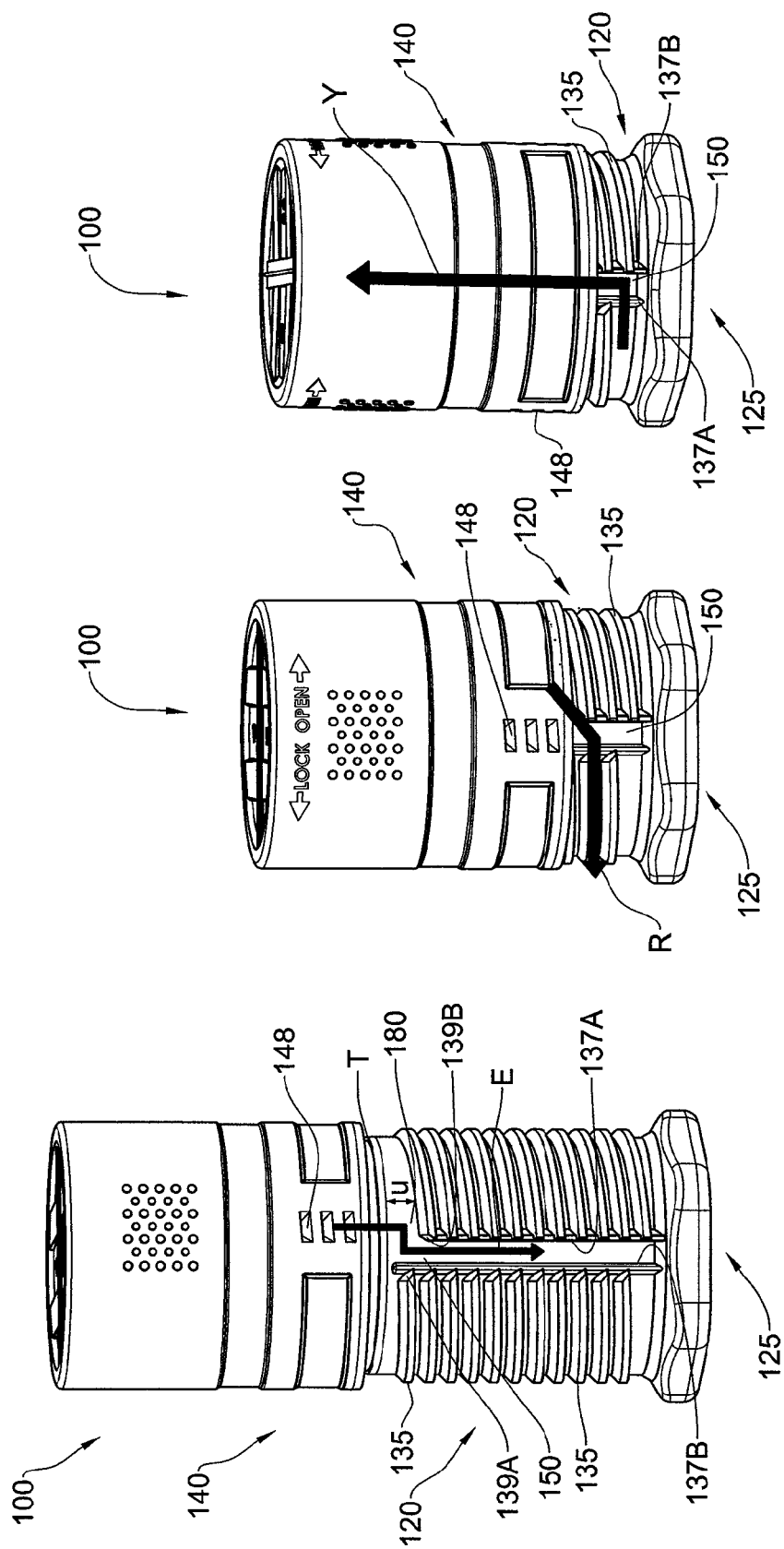

FASTENING ASSEMBLY AND CONTAINER COMPRISING THE SAME

This is a National Phase Application filed under 35 U.S.C. 371 as a national stage of PCT/IL2013/050419, with the filing date of May 16, 2013, an application claiming the benefit under 35 USC 119(e) U.S. Provisional Patent Application No. 61/648,298 filed on May 17, 2012, the entire content of which is hereby incorporated by reference in its entirety.

FIELD OF THE DISCLOSED SUBJECT MATTER

The present disclosed subject matter relates to fastening assembly and articles comprising the same. In particular, the disclosed subject matter relates to readily fastening and releasing thread-type fastening assemblies and a container system configured with the same.

BACKGROUND

Fastening assemblies and containers configured with threaded fastening assemblies have been in use for numerous purposes for many years. Such containers are used for storing various types of material therein, such as liquids or solids and are provided with threaded fastening assemblies to prevent unintentional disengagement between the receptacle body and the closure covering the same.

Examples of such fastening assemblies and containers are described for example in U.S. Pat. No. 3,675,804 directed to a safety closure assembly of a container including a cap having internal interrupted threads and a container neck having external specially arranged guide surfaces. U.S. Pat. No. 4,721,220 is directed to a closure having interrupted threads, wherein the interruptions between thread segments are vertically aligned with and are at least as long as thread segments in the overlapping portions of the turns of the thread.

GENERAL DESCRIPTION

The present disclosed subject matter relates to fastening assemblies and articles comprising the same. Fastening assembly according to the present disclosed subject matter refer to devices connecting two objects together. Articles configured with fastening assemblies in accordance with the disclosed subject matter can refer for example to container systems or parts thereof, couplers for articulating one element to another.

As used herein, the term "fastener" refers to any suitable connecting or tightening mechanism.

In accordance with an aspect of the disclosed subject matter, a fastening assembly is disclosed. The fastening assembly extends along a longitudinal axis and comprises a cylindrical neck member. The cylindrical neck member comprises a series of convolutions axially extending around at least a portion of the external surface of the neck member and forming an interrupted helical thread of incomplete formation. The fastening assembly further comprising a collar member configured for screw fastening with the neck member. The collar member having an inner cylindrical surface comprising at least one rib configured for thread-engagement with the helical thread, the at least one rib forming a portion of an internal thread. In accordance with this aspect each convolution of the series of convolutions extends from a lead end to a brake end and the brake end is spaced from the lead end forming therebetween a sliding gap constituted by the incomplete formation of the interrupted helical thread.

In accordance with another aspect of the invention, a container system is disclosed. The container system extends along a longitudinal axis and comprises a receptacle member and a closure member. The receptacle member according to this aspect comprises a cylindrical neck member and a series of convolutions axially extending substantially along and around at least a portion of the external surface of the neck member and forming an interrupted helical thread of incomplete formation. The closure member is configured with a collar member for fastening over the neck member. The collar member is configured for screw fastening over the neck member, the collar member having an inner cylindrical surface comprising at least one rib configured for thread-engagement through the helical thread, the at least one rib forming a portion of the internal thread. According to this aspect, each convolution of the series of convolutions comprises a lead end and a brake end, such that the convolution extends from the lead end to the brake end and wherein said brake end is spaced from said lead end forming a sliding gap constituted by the incomplete formation of the interrupted helical thread.

Any one or more of the following features and designs can be incorporated in a fastening assembly and/or articles comprising the same, according to the present disclosed subject matter, independently or in combination with one or more features or designs:

- the fastening assembly and/or the articles comprising the same can be at least in part formed from a rigid though resilient material such as plastic; rubber, wood, etc.;
- the convolutions and the ribs are formed from a rigid though resilient material such as plastic; rubber, wood, etc.;
- the sliding gap can axially extend along at least a portion of the neck member, parallel to the longitudinal axis;
- the sliding gap can extend in a zigzagged manner along at least a portion of the neck member;
- the sliding gap can extend in a non axial fashion along a portion of the neck member e.g. along a helical path; In such a configuration, the ribs will be arranged in a respective, helical manner to allow threading;
- the sliding gap can be configured with an entry port near a top portion of the convolution;
- the at least one rib is configured for slidable displacement along the gap;
- the at least one rib has a width narrower than the width of the sliding gap;
- the neck member can comprise at least two radially displaced sliding gaps. In such a configuration the sliding gaps are typically equiradially displaced;
- the brake ends can be connected by an arresting wall; in accordance with an embodiment, the arresting wall can be configured for preventing threading of the at least one rib thereover on either side thereof or both sides thereof;
- the arresting wall can extend radially outwards from the external surface of the neck member and can project at least to a height corresponding to the height of the convolution;
- a gliding surface can be configured adjacent at least one side of the arresting wall to facilitate threading over of the rib thereover;
- a gliding surface can be configured adjacent the arresting wall extending between each two convolutions to facilitate threading over of the rib thereover;
- the at least one rib, in a cross section, can have at least an upper, planar surface (i.e. normal to the longitudinal axis);
- the at least one rib has a generally triangular shape in a cross-section, having an upper, planar surface and a lower, sloped surface; in accordance with a specific embodiment, each convolution has a corresponding however inverted, structure in a cross section, with a planar surface at the bottom and a sloped surface at the upper side thereof. In accordance with this embodiment, when engaged, the planar surface of the rib will abut the planar surface of the convolution in a manner that will prevent unintentional disengagement of the at least one rib and the convolutions;

the at least one rib has a generally trapezoid shape in a cross-section; the trapezoid may be an isosceles trapezoid or a right angled trapezoid, in accordance with a specific embodiment, each convolution has a corresponding however inverted, structure in a cross section the at least one rid has a rectangular or a square shape in cross section;

the at least one rib can be configured for threading through the lead end of any one of the convolutions.

BRIEF DESCRIPTION OF THE DRAWINGS

In order to understand the disclosure and to see how it may be carried out in practice, embodiments will now be described, by way of non-limiting examples only, with reference to the accompanying drawings, in which:

FIGS. 6A to 6C illustrate the container assembly in its various stages of engagement, open, partially closed and fastened;

DETAILED DESCRIPTION OF EMBODIMENTS

Figure 1:
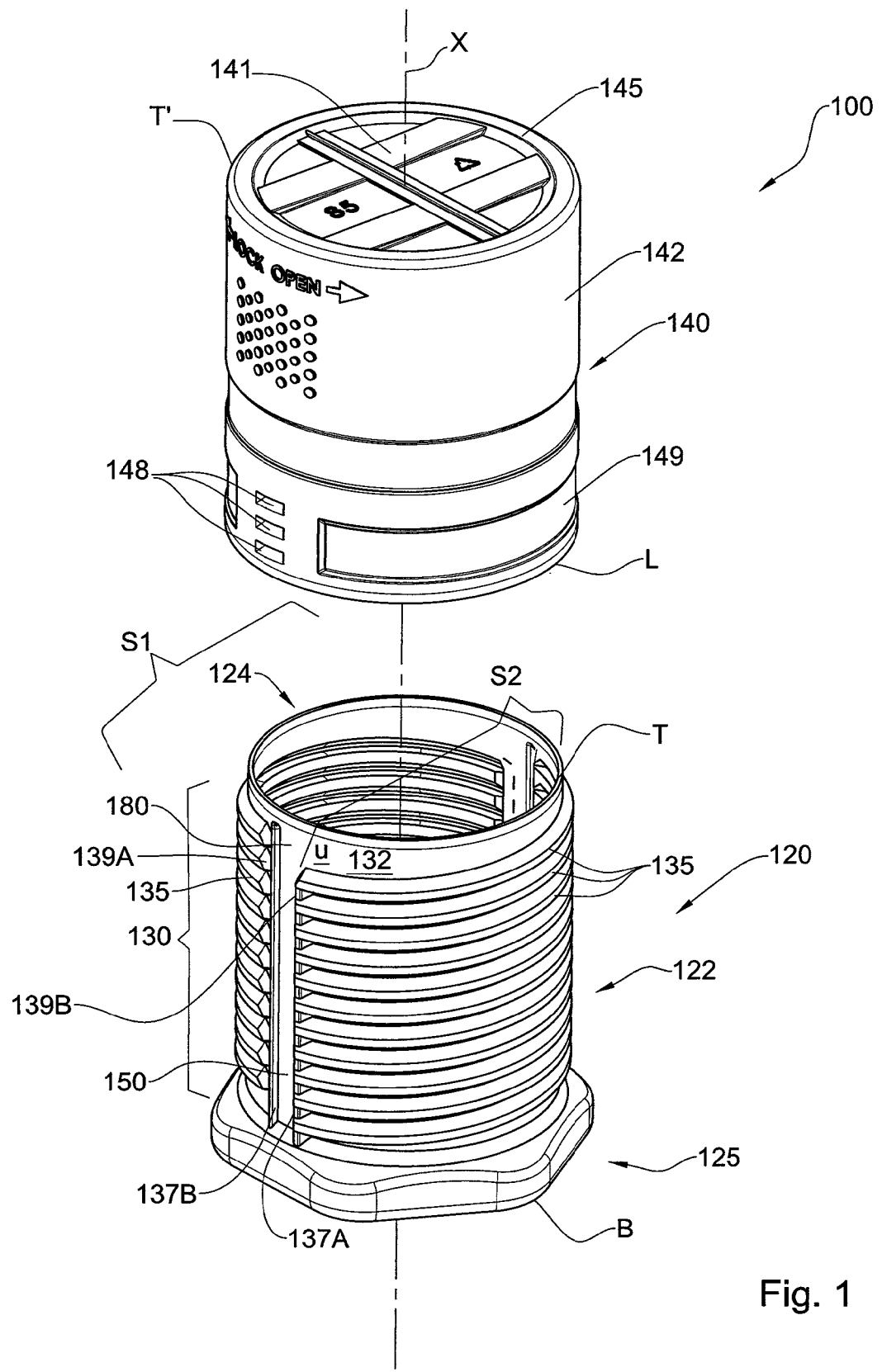
FIG. 1 is a front view of a container assembly in a disengaged configuration showing a receptacle member and a closure member in accordance with an example of the disclosed subject matter.
Figure 2A:
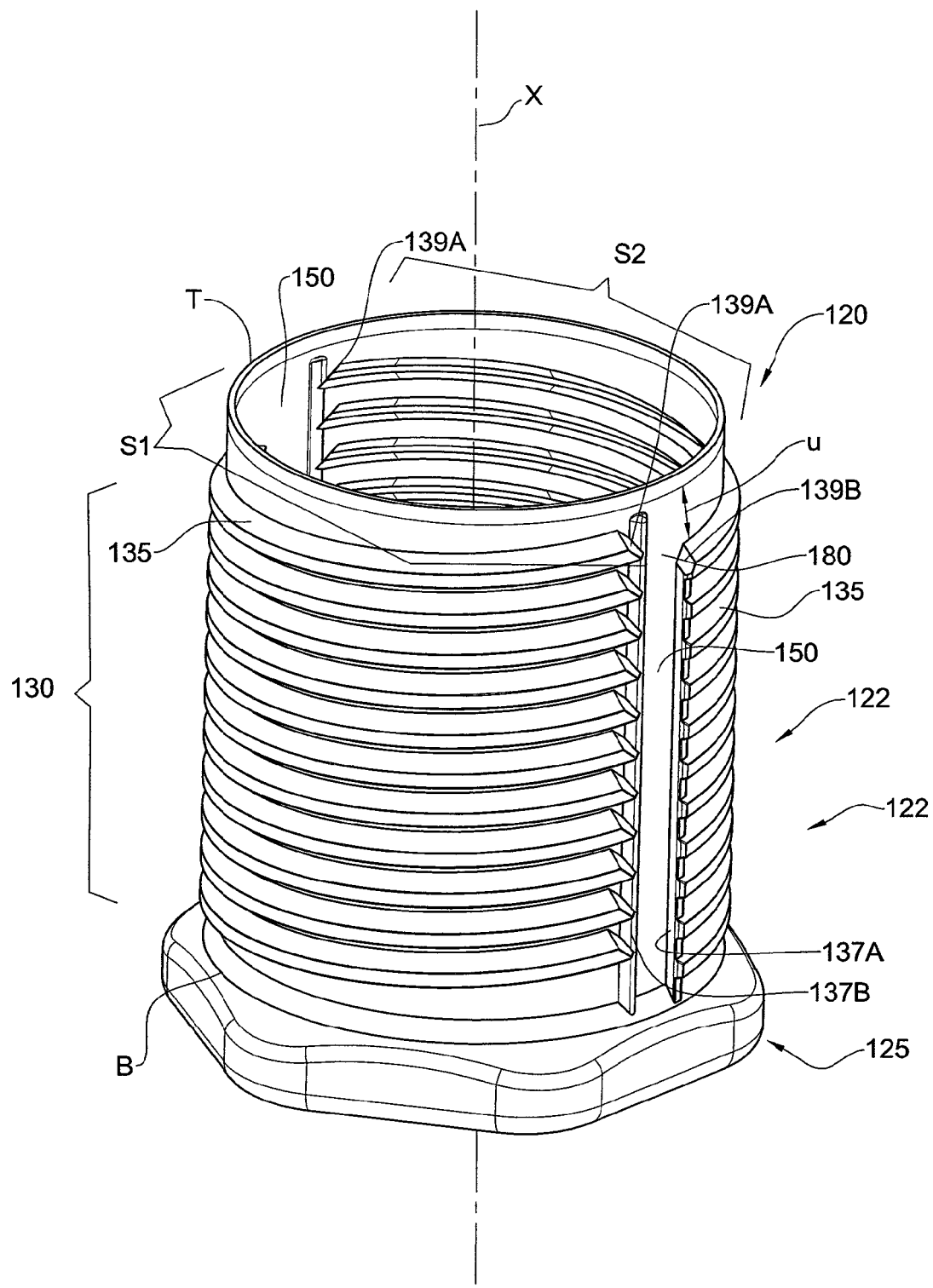
FIG. 2A is an isometric view of the receptacle member of FIG. 1.
Figure 2B:
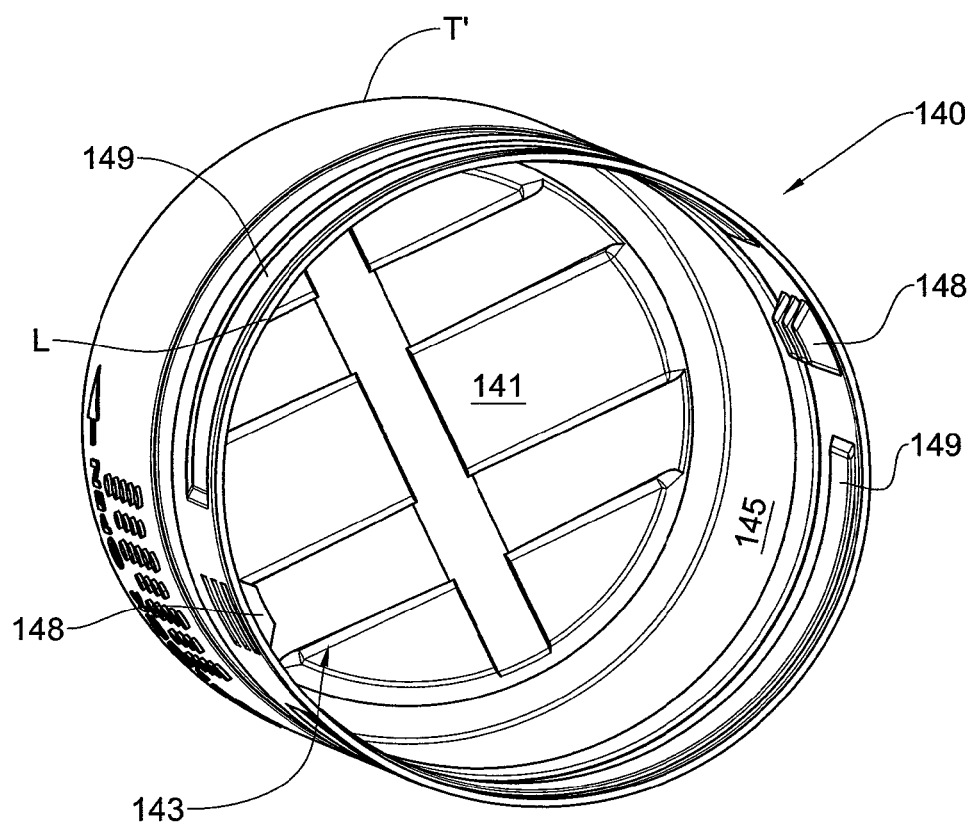
FIG. 2B is a bottom isometric view of the closure member of FIG. 2A.

For purpose of illustration, the disclosed subject matter will be described as applied to a container system. Attention is first directed to FIGS. 1-2B illustrating a container system, generally designated 100, in accordance with an example of the disclosed subject matter. The container 100 extends along a longitudinal axis X and comprises a receptacle member 120 and a closure member 140. In the exemplary embodiment the container is generally cylindrical in shape.

The receptacle member 120 has a bottom end B and a top end T, a base 125 provided at the bottom end B thereof and a cylindrical neck member 122 extending from the base 125 towards the top end T of the receptacle member 120 forming an open top 124 receptacle.

The neck member 122 comprises a series of convolutions 135 equally disposed along and around a portion 130 of an external surface 132 of the neck member 122, forming a portion of an external thread. Each convolution is divided into two spaced apart sections S1 and S2, each having a lead end 139A and a brake end 139B. The convolutions thus form an interrupted helical thread of incomplete formation resulting in two interruptions thereon.

The convolution sections S1 and S2 are equiradially displaced giving rise to two parallel sliding gaps 150 vertically extending along the portion 130, between the lead ends 139A and the brake ends 139B. The gaps 150 in this example extend parallel to the axis X.

It will be appreciated that in alternative examples the sliding gap can be non axial, e.g. in a zigzagged fashion (typically at right angles) along the portion 130.

Figure 5B:
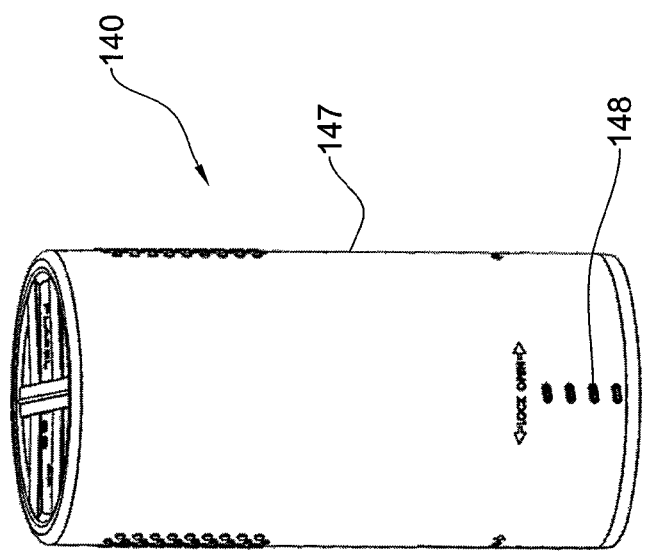
FIGS. 5A and 5B illustrate the receptacle and the closure member respectively, in accordance with another example of the disclosed subject matter.
Figure 5A:
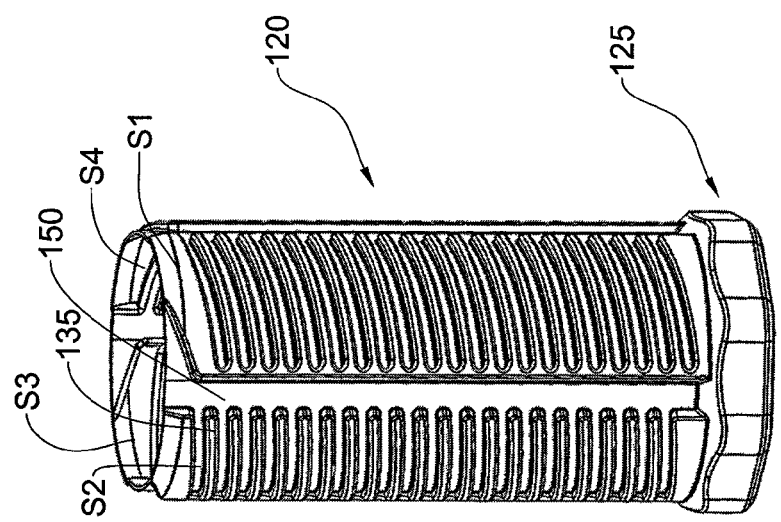

Furthermore, this example illustrates two sliding gaps separating the two sections S1 and S2. In alternative examples, the neck member can comprise only one sliding gap, or more than one sliding gaps. One such example is illustrated in FIG. 5A, showing a neck member with four sections (S1-S4) of convolutions resulting in four symmetrical sliding gaps 150 vertically extending from the top end of the receptacle member to the bottom end thereof.

Reverting now to FIGS. 1 to 2B, the gap 150 is configured with an entry port 180 near a top portion of the container. In this example, the sliding gap 150 extends from the top end T of the receptacle neck 122 and down to the bottom end B thereof. While in this example the neck member is provided with convolutions starting substantially at its top end T, it will be appreciated that the neck member can have a cylindrical collar (neck portion) above the portion 130 devoid of any convolutions. In such a configuration, the entry port can be configured near a top portion of the convolution. Alternatively, such a cylindrical collar can have a thread therearound.

The brake ends are connected by an arresting wall 137A along an axis parallel to the longitudinal axis X. The arresting wall extends at a right angle α radially outward from the outer surface of the neck member 120 (best seen in FIG. 3C). The arresting wall 137A projects to a height H corresponding to the height h of the convolution 135 (also seen in FIG. 7). It is appreciated that the arresting wall 137A can be higher or lower than the convolutions.

In accordance with this example, a gliding surface 138 is configured adjacent one side of the arresting wall 137A, facilitating threading over of the ribs 148 thereover. The gliding surface 138 extends between each two convolutions 135. The gliding surface 138 is an inclined surface extending from the surface 132 towards the arresting wall 137A. In accordance with this example, the ribs 148 can jump/skip over the surface of the surface 138 when threaded in a tightening/threading direction and are prevented from entering the convolutions when an unintentional attempt is made to thread them in a counter direction. It will be appreciated that other configurations are envisioned which will allow the ribs 148 to thread over the arresting wall 137A from either side when force is applied.

In the present example, the lead ends are connected by an entry wall 137B extending radially outwards from the outer surface of the neck member 120. The height H' of the entry wall 137B is lower than the height h of the convolution 135. It will be appreciated that the entry wall is an optional feature and the lead ends can be open, not connected, as seen in FIG. 5A.

Figure 7:
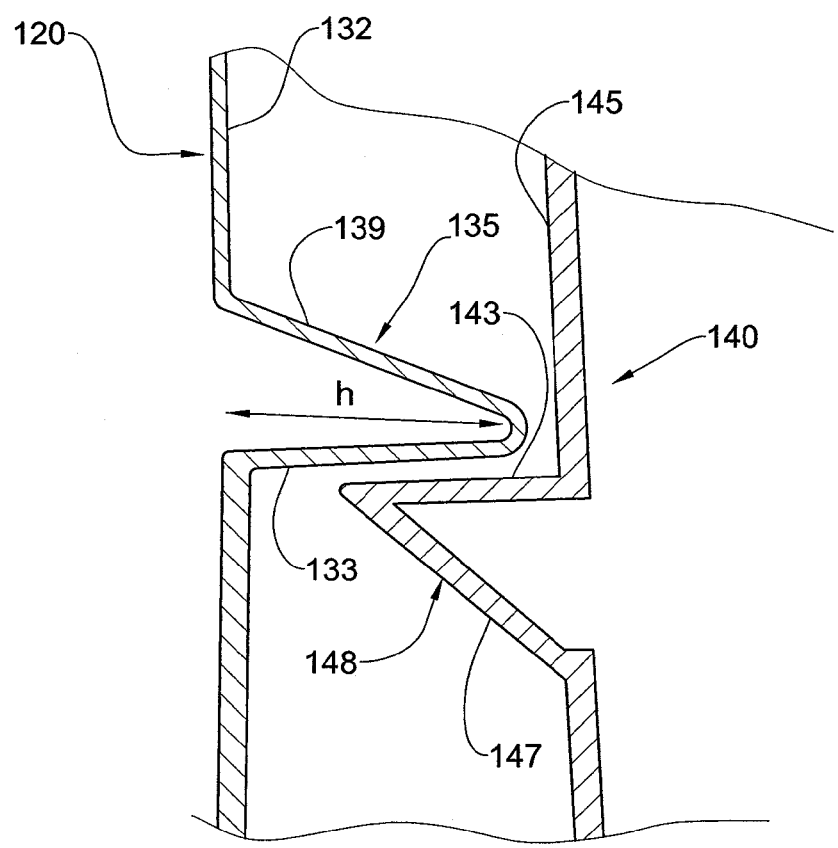
FIG. 7 illustrates an enlargement of portion IV in FIG. 6D, with the rib abutting the convolution.

In the exemplary embodiments shown in FIGS. 1 to 5C, the convolutions 135 have a generally triangular shape in a longitudinal cross-section (as best seen in FIG. 7), with a sloped surface 139 and a generally planar, engaging, surface 133. It will be appreciated that other configurations are encompassed by the disclosed subject matter, such as for example, a truncated triangular configuration of the convolution, etc.

The closure member 140 has a top edge T' and a lower terminal end L, a lid section 141 with a collar member 142 extending therefrom forming together a cylindrical closure with an open bottom 143 having an inner cylindrical surface 145. The closure member is configured for fastening over the neck member 122. The collar member 142 has two sets of internal threads, each comprising three ribs 148, radially and inwardly extending from the cylindrical surface 145 at the lower end L of the closure member, forming a portion of an internal thread. The ribs 148 are parallely disposed and in the present example are also axially disposed having an equal width. The ribs are configured to engage the corresponding external threads 135 on the neck 122 of the receptacle 120.

Figure 3A:
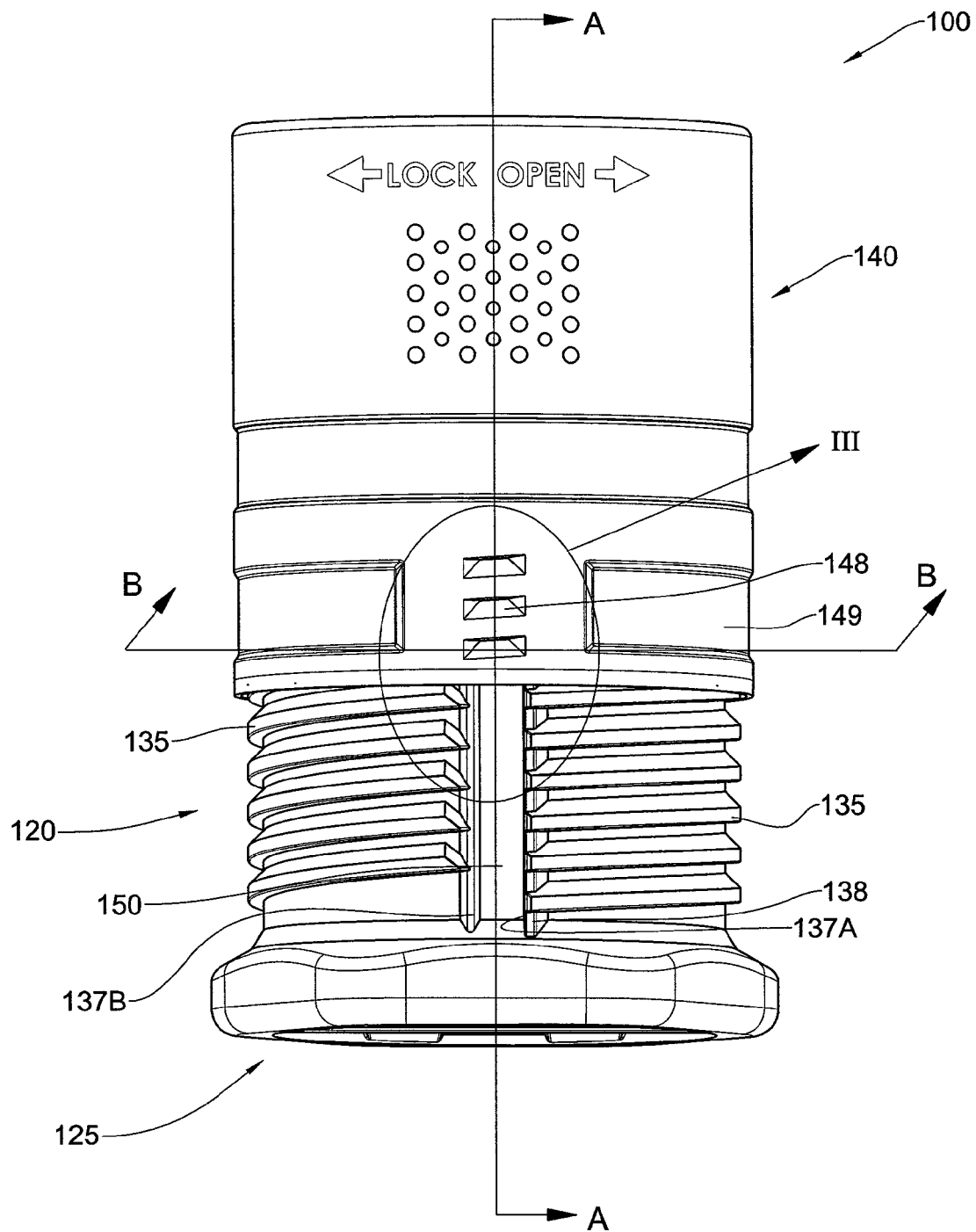
FIG. 3A is a front isometric view of the container assembly of FIG. 1 at one engaged position with the ribs extending with the sliding gap of the receptacle.
Figure 3B:
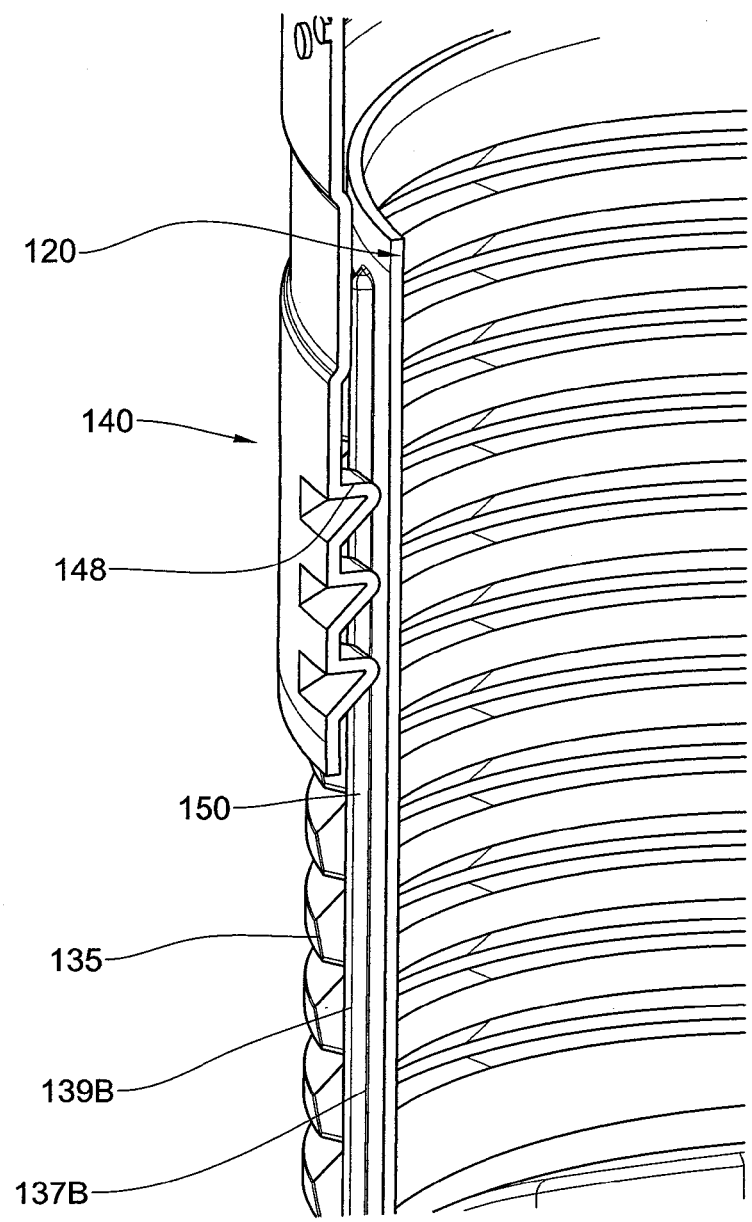
FIG. 3B is a cross sectioned view of the portion marked III of the container assembly of FIG. 3A, taken along the line A-A in FIG. 3A.
Figure 3C:
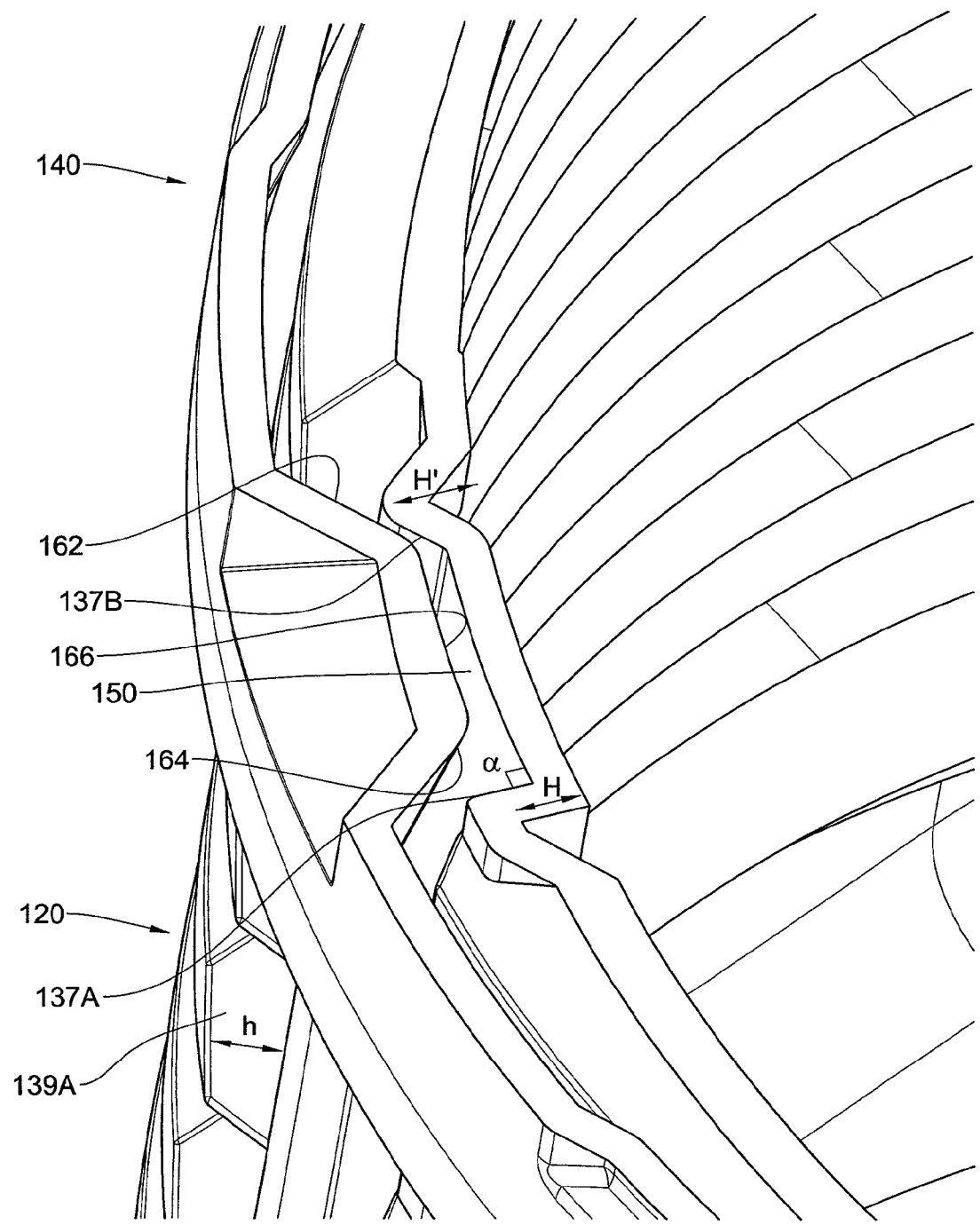
FIG. 3C is an enlarged portion of the cross sectional view of the container assembly of FIG. 3A along the line B-B in FIG. 3A.
Figure 4A:
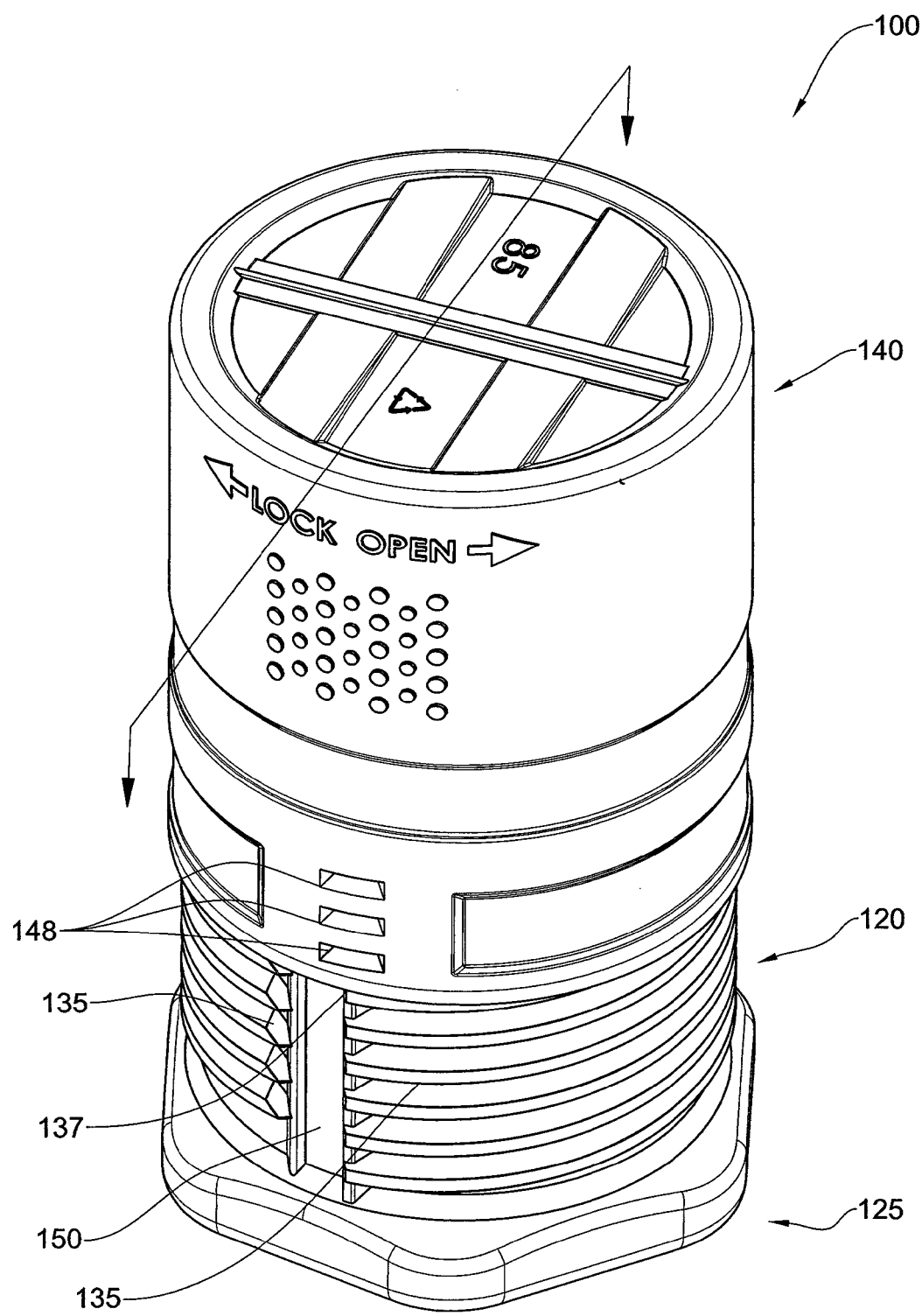
FIG. 4A is an isometric view of the container assembly of FIG. 1 at another engaged configuration, with the ribs partially engaged with the threading of the convolutions.
Figure 4B:
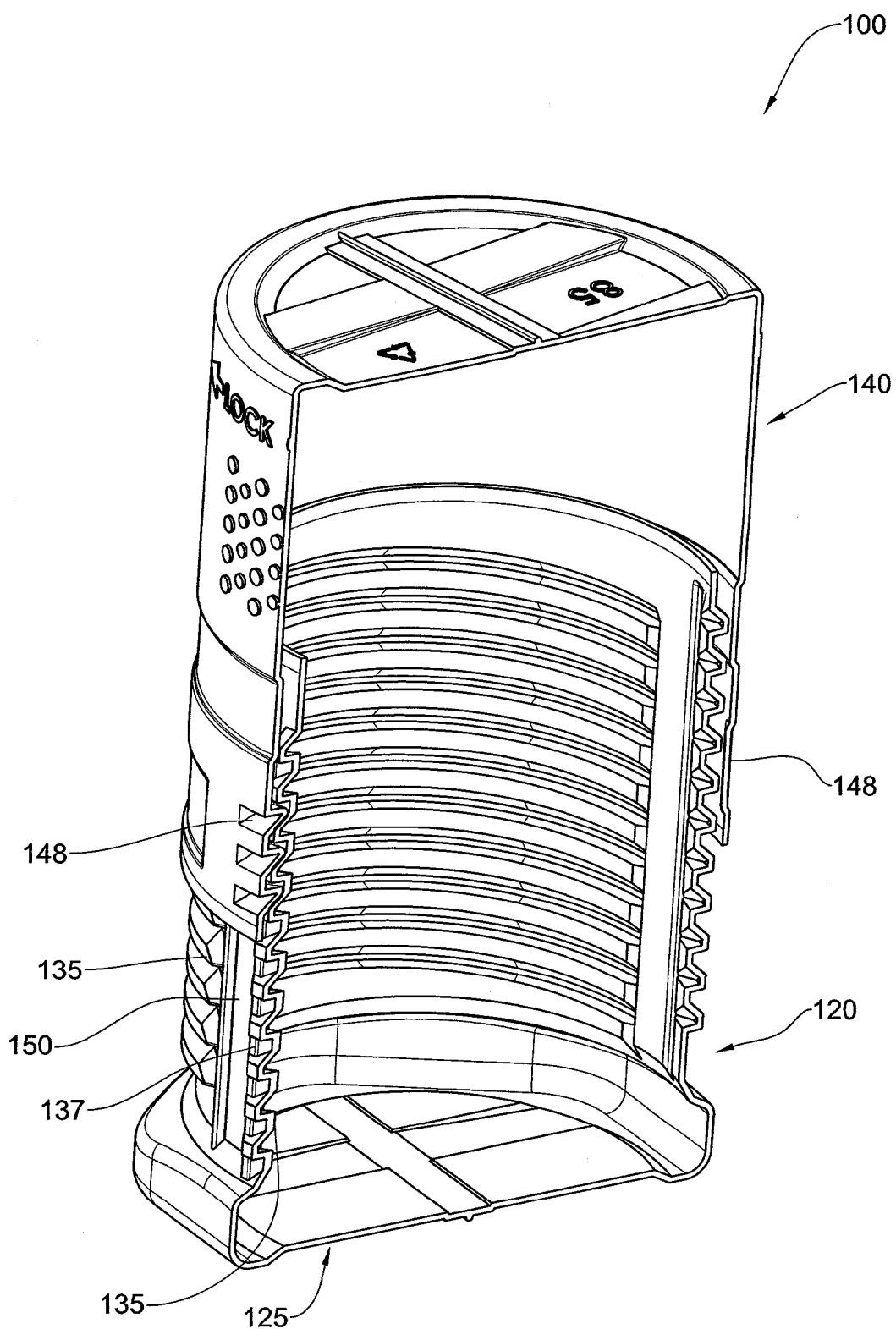
FIG. 4B is a cross sectional view of the container assembly of FIG. 4A along the line C-C in FIG. 4A.

The ribs 148 disposed at the inner surface 145 of the closure member 140 are also configured for slidable displacement along the sliding gap 150. As such, the ribs 148 are narrower than the width of the sliding gap 150 as best seen in FIG. 3C. While this example illustrates three ribs in each set, it will be appreciated that other configurations are envisioned, i.e. one or more (e.g. as seen in FIG. 5B illustrating a closure member configured with four ribs in each set, four sets in this example corresponding to the four sliding gaps).

As seen in the cross section taken perpendicular to the longitudinal axis X the rib 148 has a substantially trapezoidal shape (best seen in FIG. 3C) having two sloped walls 162 and 164 and a straight edge 166 connecting the walls 162 and 164. The sloped wall 162 allows the rib to easily slide over the entry wall 137B when screwed over and into the external thread portion 130 (i.e. in a clockwise direction) and the wall 164 will permit exit of the rib 148 therefrom when threaded out of the external thread (i.e. in a counter clockwise direction).

In this example, in the ribs 148 have a generally triangular cross section (as best seen in FIG. 7), with a sloped surface 147 and a generally flat, engaging, surface 143 (extending normal to the axis X). It will be appreciated that other configurations are encompassed by the disclosed subject matter, such as for example a truncated triangular configuration of the rib etc.

As further seen in FIG. 7, when threaded through the convolution 135, the rib 148 engages it such that the engaging face 143 of the rib 148 and the engaging face 133 of the convolution 135 abut each other. In such a configuration, the rib is prevented from unintentional disengagement from the convolution, e.g. when the closure member 140 is pulled upwardly away from the receptacle member 120. On the other hand, the configuration of the sloped surface 139 of the convolution and the sloped surface 147 of the rib permit axial displacement of the closure with respect to the receptacle, i.e. the ribs skipping over the convolutions into a snap engagement at a desired level (e.g. upon encountering an object received in the container, or with the lower edge L engaging the bottom end B of the receptacle) of the rib longitudinally over the convolutions when the closure is pushed down over the receptacle.

Figure 6D:
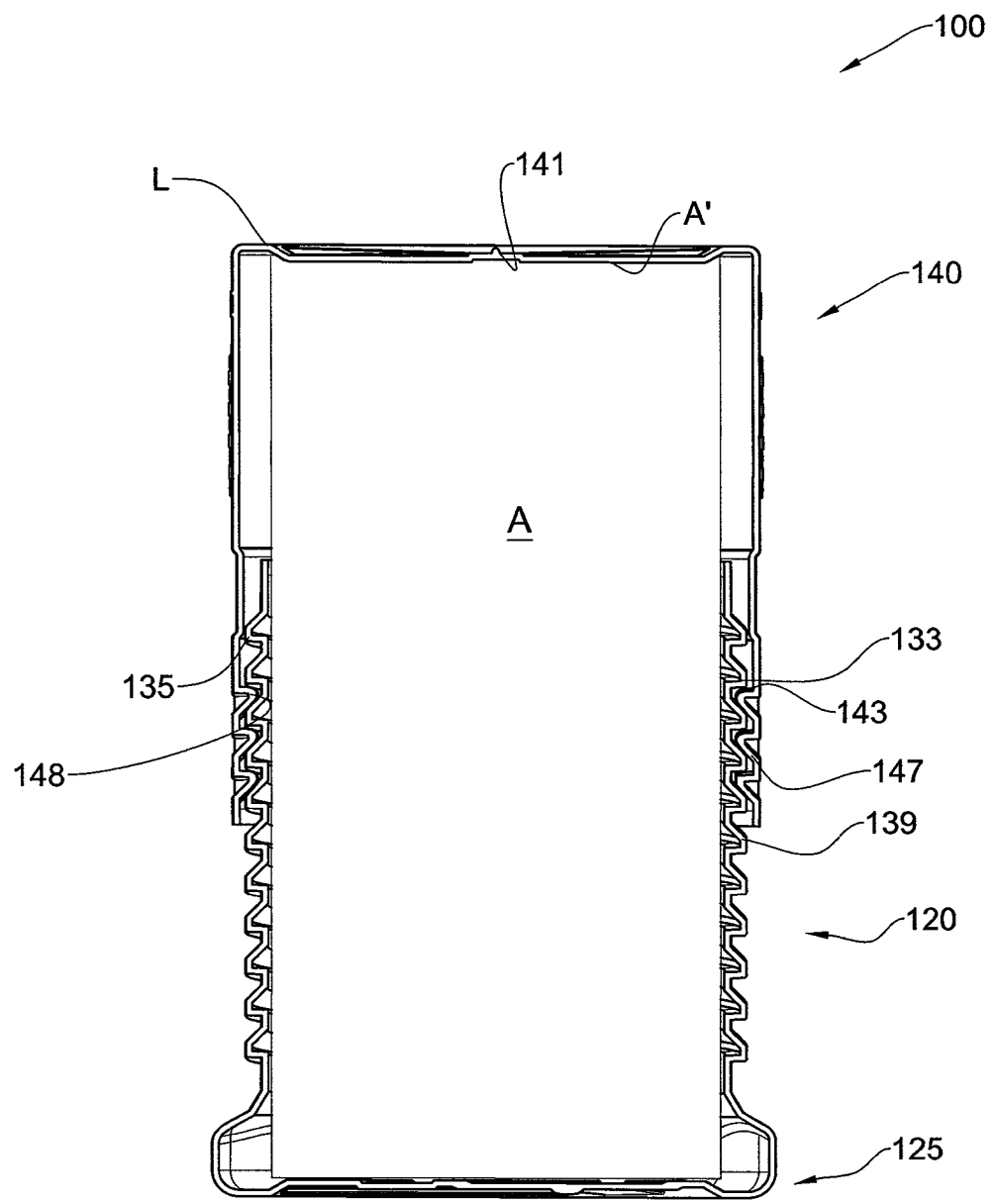
FIG. 6D illustrates a cross sectional view of the container assembly in FIG. 6C, in accordance with the disclosed subject matter.

Attention is now drawn to FIGS. 6A-6C illustrating the container assembly 100 in various modes of engagement and fastening (tightening). FIG. 6A illustrates the first stage of placing the closure 140 above the receptacle 120 with the arrow E illustrating the path of the ribs 135 towards a desired level of coupling of the closure 140 over the receptacle 120. As can be seen in FIG. 6A the lead end 139A of the upper most convolution 135 is closer to the top end T of the receptacle member 120 than the brake end 139B of the uppermost convolution 135 resulting in an unthreaded area U. In this configuration the ribs 148 will be guided into the sliding gap 150 by the unthreaded area up to their entry into the gap 150.

In FIG. 6B, the closure member 140 is partially covering the receptacle member 120, with the ribs 148 slidably displaced within the sliding gap 150. The arrow R indicates the direction in which the closure member 140 is to be displaced (in a rotational fashion) for the ribs 148 to enter the thread through the lead end 139A of the convolutions 135. An isometric view of this mode is presented in FIG. 3A with FIGS. 3B and 3C illustrating longitudinal and transverse cross sections of portions of the assembly 100.

It will be appreciated that the disclosed subject matter allows fastening of the closure member 140 at any height of the receptacle 120 without the need to thread the ribs all the way to the desired point of fastening. To fasten the closure member to the receptacle, it is essentially sufficient to turn the closure member so as to permit the sloping wall 164 of the rib 148 to pass the entry wall 137B, such that the engaging surface 143 of at least one rib engages and abuts the surface 133 of the convolution. The closure member 140 can be fastened at any desired position by simply twisting it to allow threading of the ribs over the external thread of the receptacle member 120. In the example illustrated in FIG. 6D, the receptacle holds an article designated A which has a height substantially exceeding the height of the receptacle member 120. As such, the article A protrudes over the top end T of the receptacle member 120. In accordance with this example, the closure member 140 is sled through the sliding gap 150 (not seen in this illustration) until the lid section 141 engages the uppermost edge A' of the article A. The ribs 148 of the closure member 140 are then rotated such that the ribs 148 are engaging the external thread 130 of the receptacle 120, the closure member is pulled downwards by the threading motion such that the engaging surface 143 of the ribs 148 engages and is pressed against the respective engaging surface 133 of the convolutions 135. Thus, force is exerted between the closure member 140 and the receptacle member 120 via the article A, with the article tightly held between the base 125 of the receptacle 120 and the lid section 141 of the closure member 140. In this configuration, the movement of the closure member is substantially prevented and will be allowed by application of counter pressure to unthread the ribs until reaching the sliding gap.

The closure member is configured with an inwardly protruding band-like section 149 (e.g. seen in FIGS. 1 and 2B) to facilitate tight grip between the closure member and the receptacle during the engagement process and to prevent movement between the two. The inwardly protruding section 149 is provided at the bottom portion of the closure member and slightly protrudes into the inner surface of the closure member. It will be appreciated that the band-like section may be continuous or segmented and may have any geometrical configuration, e.g. flat, rounded etc.

FIG. 6C shows the container system in a fastened configuration with the arrow Y depicting the path of the ribs towards an unfastened mode. The closure member will be rotatated in a counterclockwise direction allowing the ribs to exit the thread into the sliding gap so as to allow slidable displacement therethrough.

The invention claimed is:

1. A fastening assembly extending along a longitudinal axis, comprising:
   a cylindrical neck member comprising a series of convolutions axially extending around at least a portion of the external surface of the neck member and forming an interrupted helical thread of incomplete formation; and
   a collar member configured for screw fastening with the neck member, the collar member having an inner cylindrical surface comprising at least one rib configured for thread-engagement with the helical thread, the at least one rib forming a portion of an internal thread,
   wherein each convolution of the series of convolutions extends from a lead end to a brake end,
      wherein the brake end is spaced from the lead end forming therebetween a sliding gap constituted by the incomplete formation of the interrupted helical thread,
      wherein the brake ends of the series of convolutions extend in a parallel manner to each other and are interconnected by an arresting wall extending in parallel to the longitudinal axis, the arresting wall being configured for preventing threading of the at least one rib thereover,
      wherein the arresting wall extends radially outwards from the external surface of the neck member and projects at least to a height corresponding to the height of the convolutions, terminating at an edge, and
      wherein an inclined gliding surface is provided adjacent one side of the arresting wall, the inclined gliding surface extending from the external surface of the neck member and towards the edge of the arresting wall such that said at least one rib can jump over said gliding surface when threaded thereover.

2. The fastening assembly according to claim 1, wherein the sliding gap axially extends along at least a portion of the neck member parallel to the longitudinal axis.

3. The fastening assembly according to claim 1, wherein the at least one rib is configured for slidable displacement along the sliding gap which axially extends along at least a portion of the neck member parallel to the longitudinal axis.

4. The fastening assembly according to claim 1, wherein the neck member comprises at least two radially displaced sliding gaps.

5. The fastening assembly according to claim 1, wherein the at least one rib is configured for threading through the lead end of any one of the convolutions.

6. A container system having a longitudinal axis passing therethrough, comprising:
   a receptacle member comprising a cylindrical neck member, comprising a series of convolutions axially extending substantially along and around at least a portion of the external surface of the neck member and forming an interrupted helical thread of incomplete formation; and
   a closure member configured with a collar member for fastening over the neck member, the collar member configured for screw fastening over the neck member, said collar member having an inner cylindrical surface comprising at least one rib configured for thread-engagement through the helical thread, the at least one rib forming a portion of the internal thread,
   wherein each convolution of the series of convolutions comprises a lead end and a brake end, such that the convolution extends from the lead end to the brake end,
      wherein said brake end is spaced from said lead end forming a sliding gap constituted by the incomplete formation of the interrupted helical thread,
      wherein the brake ends of the series of convolutions extend in a parallel manner to each other and are interconnected by an arresting wall extending in parallel to the longitudinal axis, the arresting wall being configured for preventing threading of the at least one rib thereover,
      wherein the arresting wall extends radially outwards from the external surface of the neck member and projects at least to a height corresponding to the height of the convolutions, terminating at an edge, and
      wherein an inclined gliding surface is provided adjacent one side of the arresting wall, the gliding surface extending from the external surface of the neck member and towards the edge of the arresting wall.

7. The container system according to claim 6, wherein the rib is configured for slidable displacement along the gap.

8. The container system according to claim 6, wherein the neck member comprises at least two radially displaced vertical gaps.

9. The container system according to claim 6, wherein the at least one rib is configured for threading through the lead end of any one of the convolutions.

* * * * *